US012646915B2

(12) United States Patent
Laughlin et al.

(10) Patent No.: US 12,646,915 B2
(45) Date of Patent: Jun. 2, 2026

(54) ELECTRICAL BOX ASSEMBLY WITH MOVABLE MOUNTING ARM

(71) Applicant: Hubbell Incorporated, Shelton, CT (US)

(72) Inventors: Riley Laughlin, Shelton, CT (US); Garrett Polk, Shelton, CT (US)

(73) Assignee: Hubbell Incorporated, Shelton, CT (US)

( * ) Notice: Subject to any disclaimer, the term of this patent is extended or adjusted under 35 U.S.C. 154(b) by 205 days.

(21) Appl. No.: 18/549,643

(22) PCT Filed: Mar. 23, 2022

(86) PCT No.: PCT/US2022/021495
§ 371 (c)(1),
(2) Date: Sep. 8, 2023

(87) PCT Pub. No.: WO2022/212142
PCT Pub. Date: Oct. 6, 2022

(65) Prior Publication Data
US 2024/0162697 A1     May 16, 2024

Related U.S. Application Data

(60) Provisional application No. 63/168,061, filed on Mar. 30, 2021.

(51) Int. Cl.
H02G 3/08          (2006.01)
(52) U.S. Cl.
CPC .................................. H02G 3/083 (2013.01)

(58) Field of Classification Search
None
See application file for complete search history.

(56) References Cited

U.S. PATENT DOCUMENTS

| | | | | |
|---|---|---|---|---|
| 922,623 | A | 5/1909 | Parrish | |
| 3,418,420 | A * | 12/1968 | Zerwes .................. | H02G 3/086 174/53 |
| 5,012,043 | A | 4/1991 | Seymour | |
| 5,293,003 | A | 3/1994 | Prairie | |
| 7,659,477 | B2 * | 2/2010 | Korcz .................... | H02G 3/126 174/53 |

(Continued)

OTHER PUBLICATIONS

International Search Report and Written Opinion dated Jul. 6, 2022, which issued in the corresponding PCT Patent Application No. PCT/US2022/021495.

*Primary Examiner* — Krystal Robinson
(74) *Attorney, Agent, or Firm* — Dickinson Wright PLLC

(57)          ABSTRACT

An electrical box assembly is configured for mounting an electrical device such as an electrical wiring device. The electrical box assembly includes a box, such as a metal or non-metallic box, with an open front end having an inwardly extending shoulder forming a recess at the front end. A mounting plate is attached to the shoulder for mounting the electrical device. The mounting plate can be a metal or made of a non-metallic material. The mounting plate has an open portion and recessed surfaces on opposite sides of the open portion. A movable mounting arm is pivotally coupled to the mounting plate on one side of the open portion to pivot between an open position and a closed position overlying the open portion.

20 Claims, 11 Drawing Sheets

(56) References Cited

U.S. PATENT DOCUMENTS

| | | | | |
|---|---|---|---|---|
| 8,072,779 | B1 | 12/2011 | Haberek | |
| 8,710,367 | B2 * | 4/2014 | Korcz | H02G 3/086 |
| | | | | 174/559 |
| 8,759,676 | B1 * | 6/2014 | Gretz | H02G 3/185 |
| | | | | 439/535 |
| 2007/0235204 | A1 * | 10/2007 | Lemke | H02G 3/14 |
| | | | | 174/50 |
| 2014/0318824 | A1 * | 10/2014 | Korcz | H02G 3/08 |
| | | | | 174/50 |

* cited by examiner

ELECTRICAL BOX ASSEMBLY WITH MOVABLE MOUNTING ARM

This application claims priority to U.S. Provisional Application Ser. No. 63/168,061, filed Mar. 30, 2021, which is hereby incorporated by reference in its entirety.

FIELD OF THE INVENTION

The present invention relates to an electrical box assembly for mounting an electrical wiring device. The electrical box assembly is provided with a mounting plate and a movable mounting arm for the electrical wiring device.

BACKGROUND OF THE INVENTION

Electrical devices such as, but not limited to, electrical outlets, switches, and others are typically installed in a wall or ceiling. A single or multi-gang or junction box may be secured to a stud or support inside of the wall or ceiling. The electrical device is then secured in the box in electrical communication with one or more electrical conductors so that the electrical device is accessible through from the wall or ceiling. Any exposed portions of the electrical conductor and its connection to the electrical device can be shielded within the box.

An electrical box extension may be needed to enlarge the volume of the box to accommodate the electrical devices or additional wiring. An electrical box extension can be used when the electrical box is recessed in the wall so that the electrical device can be mounted at the wall surface or to increase the internal volume of the electrical box. The electrical box extender is often attached to the open end of the junction box with an open end for mounting the electrical device.

Although the existing electrical box devices have been suitable for the intended need, a need exists for an improved electrical box assembly for mounting an electrical device.

SUMMARY

The electrical box assembly of the present disclosure relates to a device for mounting an electrical device to an electrical box, such as an electrical junction box. In one embodiment disclosed herein, the electrical box assembly can include an electrical box and an electrical box extension coupled to the electrical box.

A feature of the present device is an electrical box assembly having an open end for receiving and supporting an electrical device. The electrical box assembly includes mounting plate attached to the open end of the electrical box. The mounting plate has a movable arm configured for mounting the electrical device where the movable arm can move to a position for accessing at least a portion of the interior of the electrical box.

In one embodiment, the electrical box assembly includes metallic or a non-metallic electrical box and an electrically conducting metal, powder coated metal, or non-metallic mounting plate attached to the open end of the electrical box. The mounting plate is configured for supporting the electrical device to the electrical box.

A feature of the electrical box assembly is to provide an electrical box extension for coupling to an electrical box, such as an electrical junction box. The electrical box extension includes one or more tabs at a base end for attaching the electrical box extender to the electrical box. An open front end of the electrical box extension has at least one and typically two mounting plates for attaching the electrical device to the electrical box extension. In one embodiment, the open front end of the electrical box extension is symmetrical and includes a mounting structure to receive the mounting plates in either a horizontal orientation along one side or a vertical orientation along an adjacent side with respect to the electrical box.

Another feature of the electrical box assembly is to provide an electrical box extension with an open end and a mounting plate coupled to opposite ends of the open end for supporting the electrical device, where each of the mounting plates has at least one movable mounting arm. The mounting plate is recessed in the open end of the electrical box extension. The mounting plate has recessed portions that receive the movable arms so that the movable arms are substantially flush with or recessed relative to the outer face of the mounting plate. In one embodiment, the mounting plate and movable arms are made of metal or other electrically conducting material. A ground connection can be made to the metal mounting plate to provide a ground for the electrical device.

In one embodiment an electrical box assembly has a front end with an opening with a dimension for receiving an electrical device, a front edge surrounding said electrical box, and a shoulder extending inwardly from a side wall of the electrical box into the opening and spaced from the front edge to define a recess at the front end. A mounting plate is received in the recess and coupled to the electrical box, where the mounting plate has a first open portion with a dimension for accessing a cavity of said electrical box assembly, and a mounting arm pivotally coupled to the mounting plate at a first side of the open portion and movable between a first position overlying the open portion and a second position exposing the open portion for accessing said cavity. The mounting arm has a mounting hole for mounting the electrical device.

In another embodiment, an electrical box assembly comprises an electrical box having an open front end; an electrical box extension having an open base end for coupling to the open front end of the electrical box, and an open front end, a recessed portion at said open front end. A mounting plate is received in the recess and coupled to the electrical box extension. The mounting plate having a first open portion with a dimension for accessing a cavity of the electrical box. A mounting arm pivotally coupled to the mounting plate at a first side of the open portion and movable between a first position overlying said open portion and a second position exposing said open portion for accessing the cavity. The mounting arm having a mounting hole for mounting the electrical device. The mounting hole can provide a threaded connection for the electrical device.

These and other features of the device will become apparent from the following detailed description, which in conjunction with the drawings disclose various embodiments of the device.

BRIEF DESCRIPTION OF THE DRAWINGS

The various aspects and advantages of embodiments of the device will be more readily appreciated from the following detailed description, taken in conjunction with the accompanying drawings, of which.

3

Figure 1:
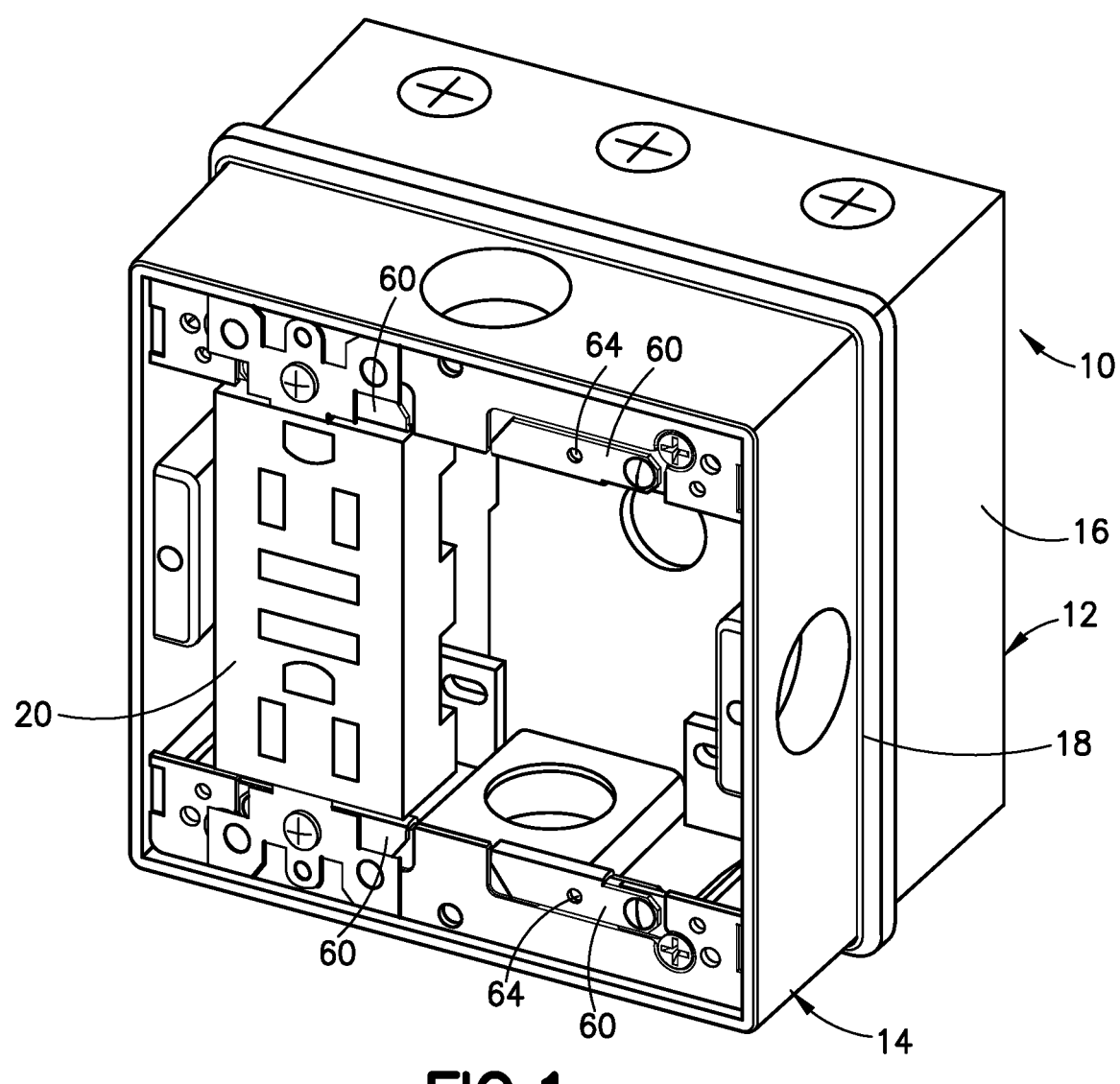
FIG. 1 is a perspective view of an electrical box assembly in one embodiment showing an electrical device mounted to the electrical box assembly.
Figure 2:
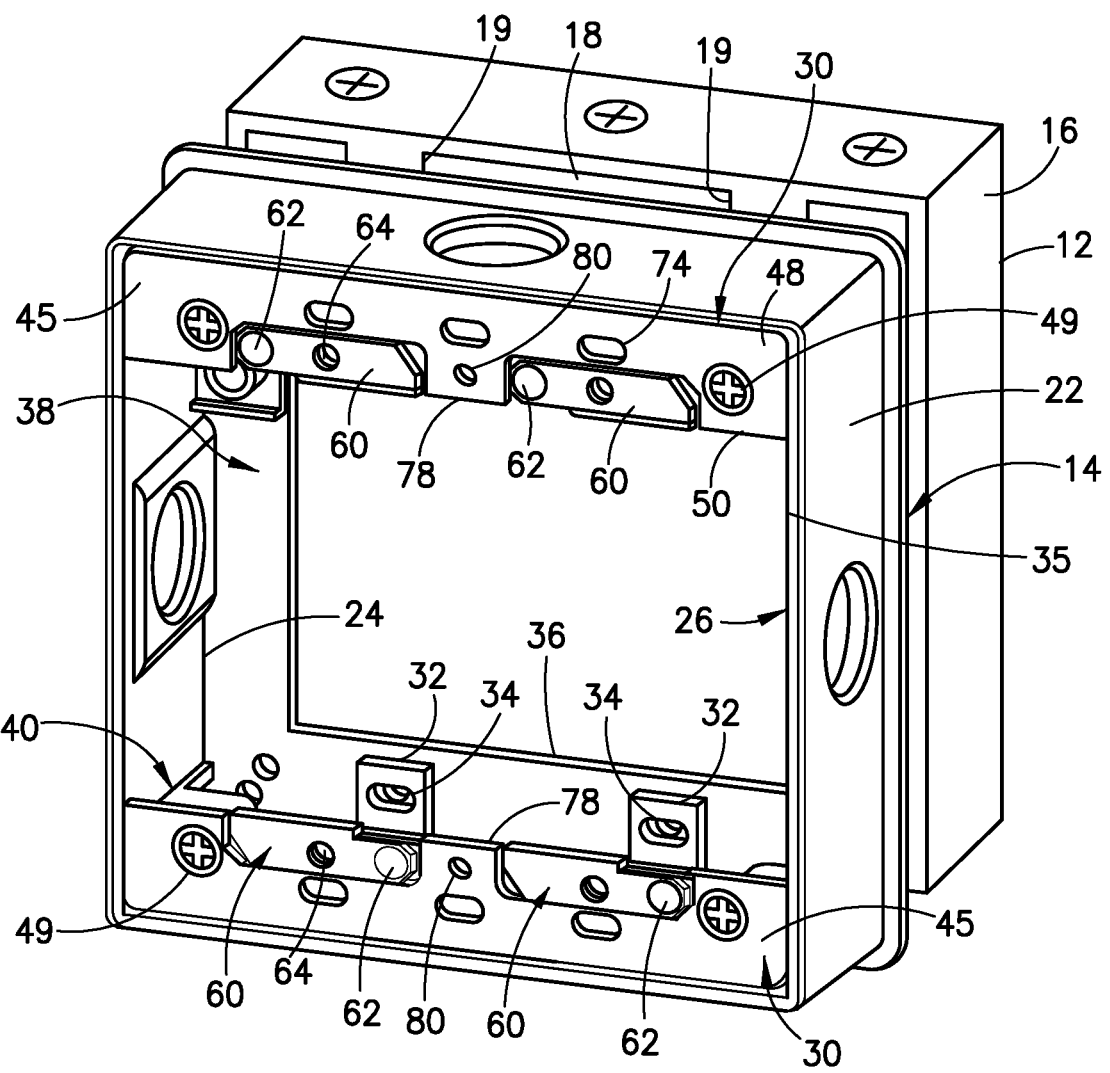
Figure 3:
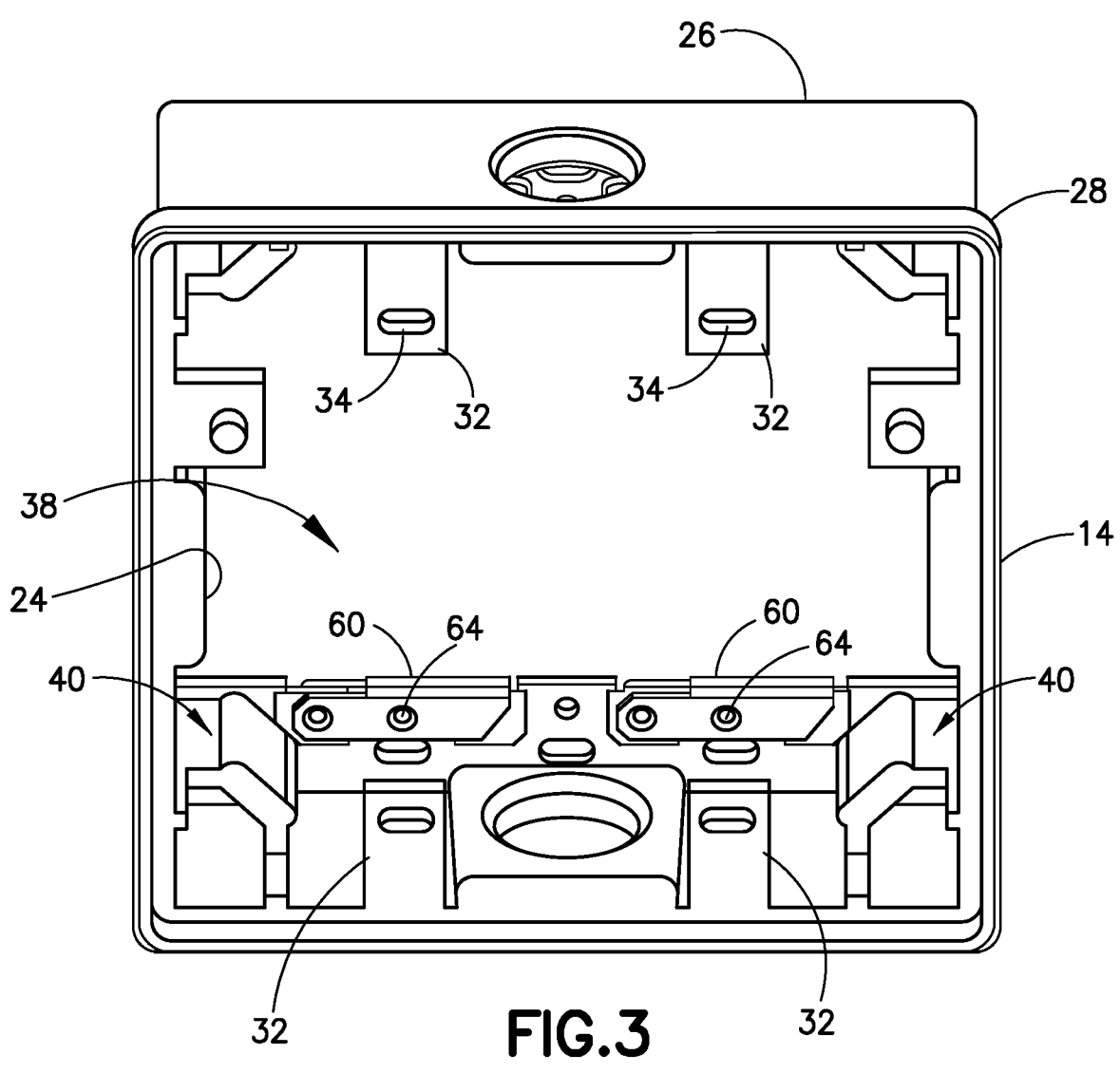
Figure 4:
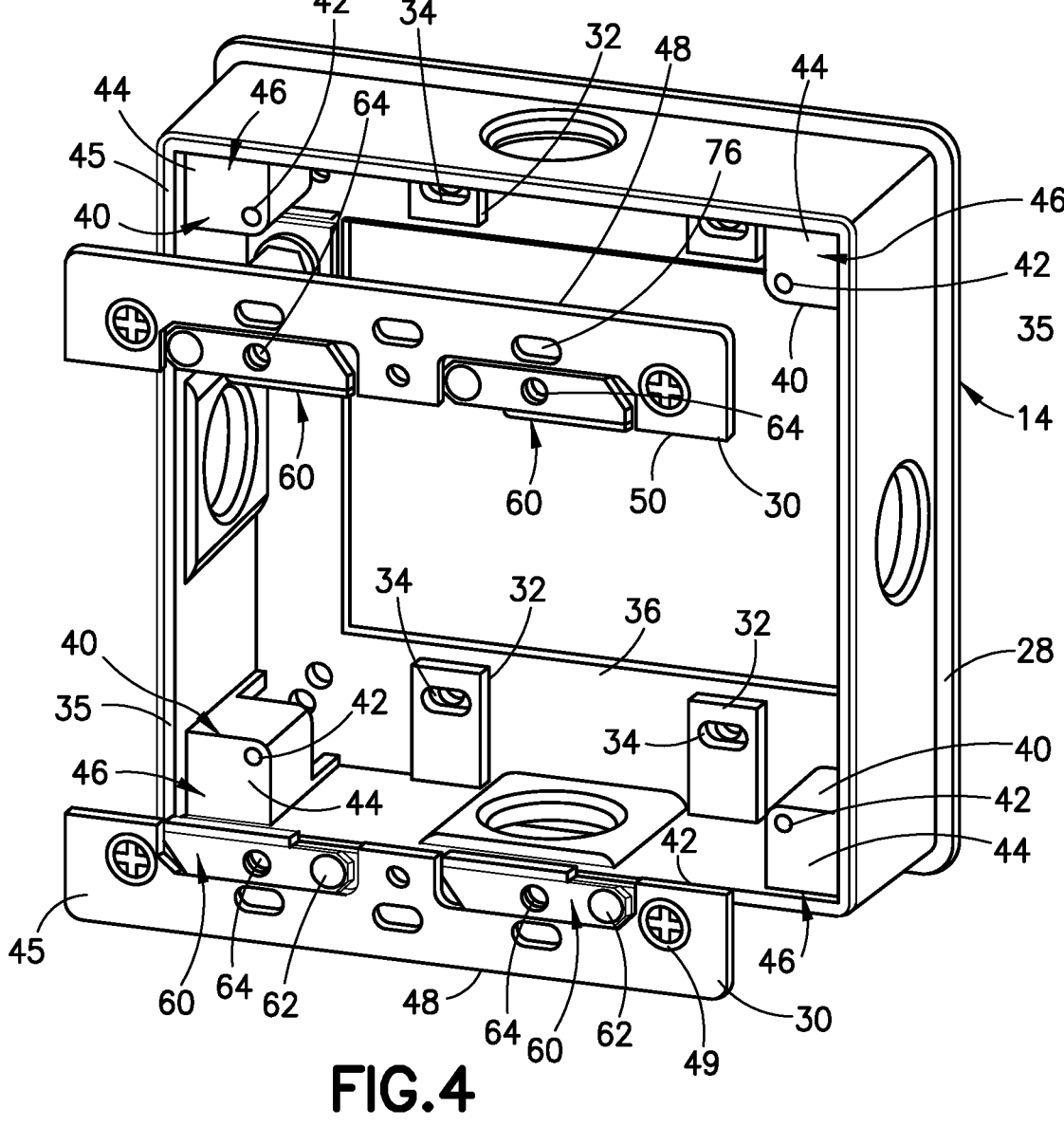
Figure 5:
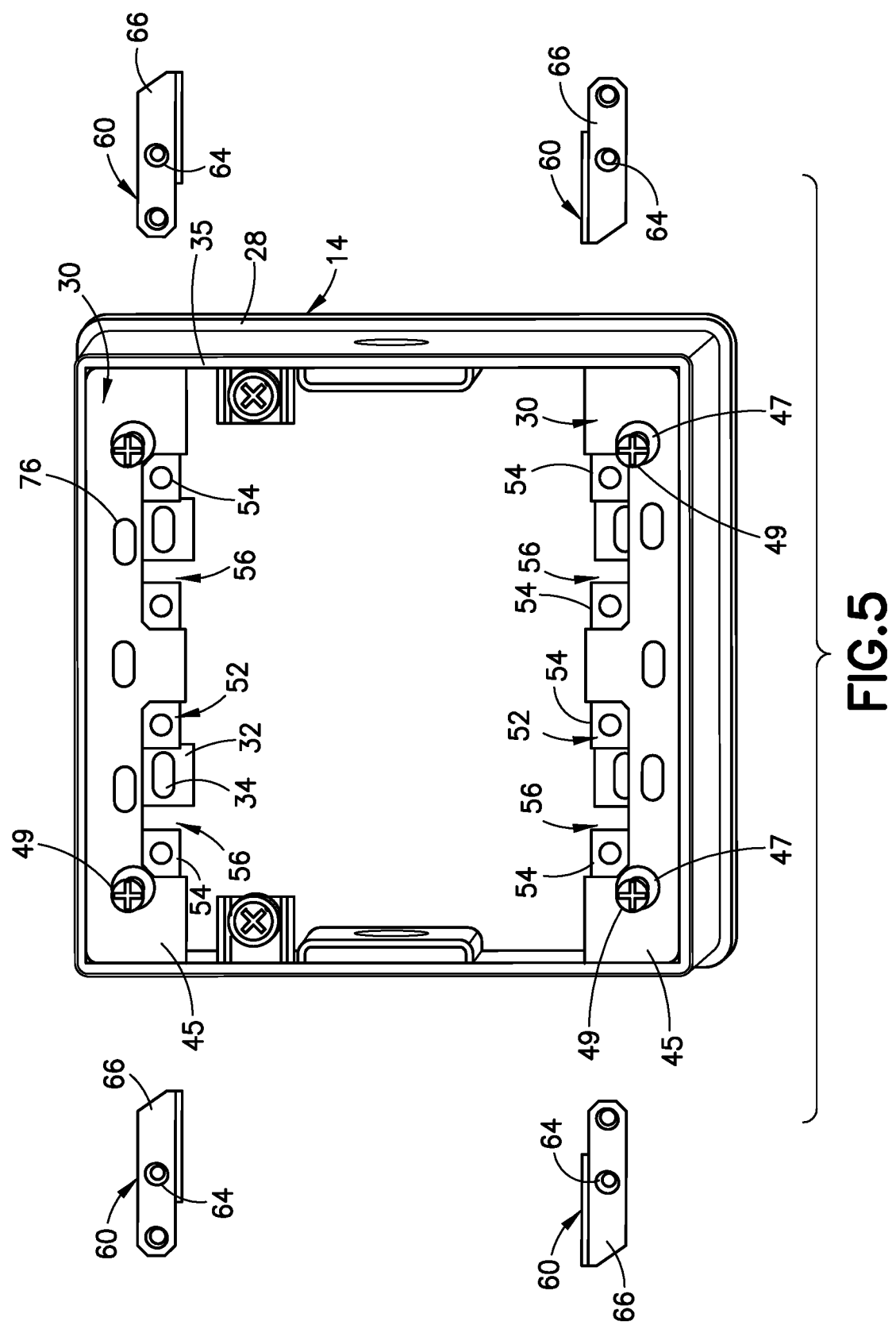
Figure 6:
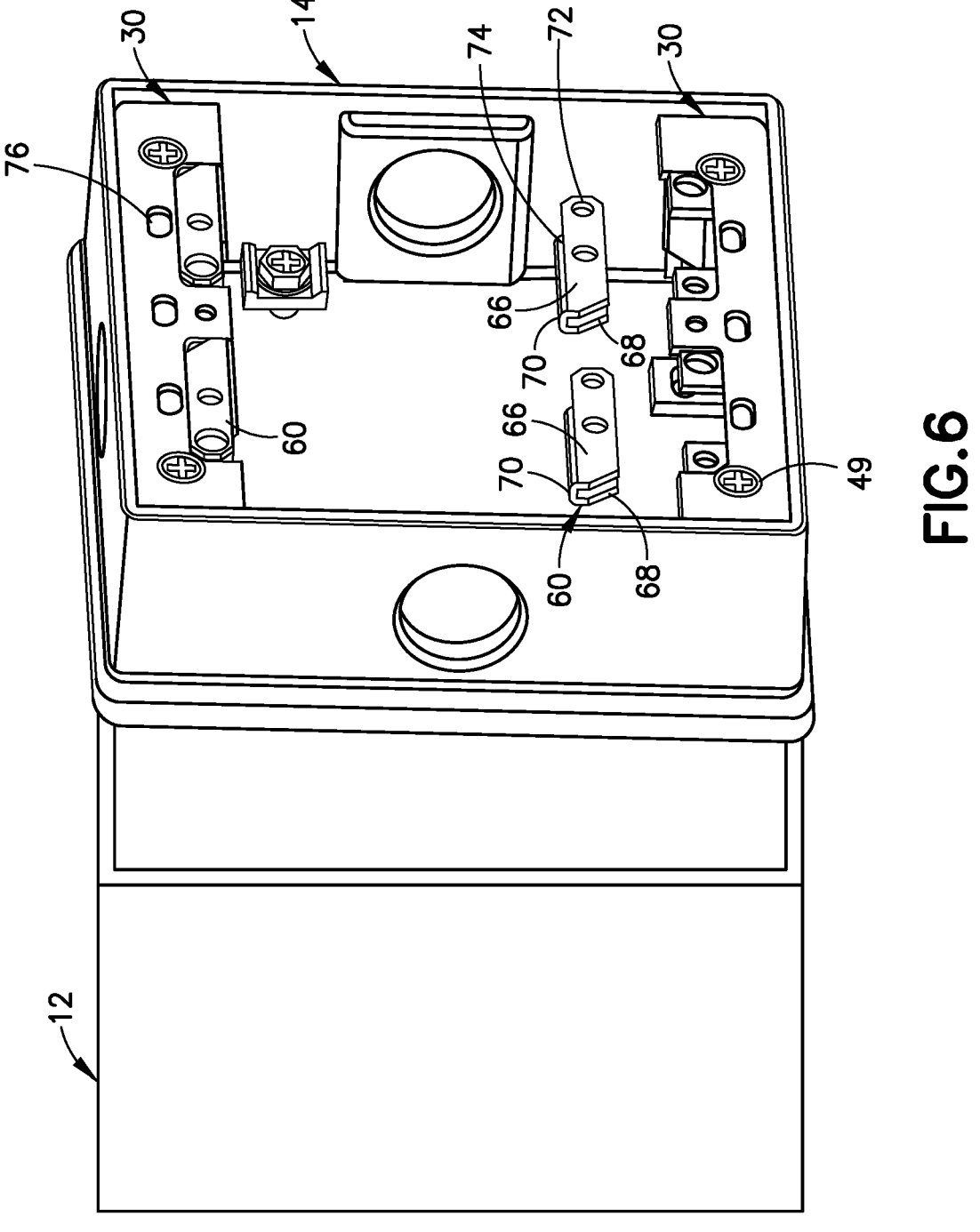
Figure 7:
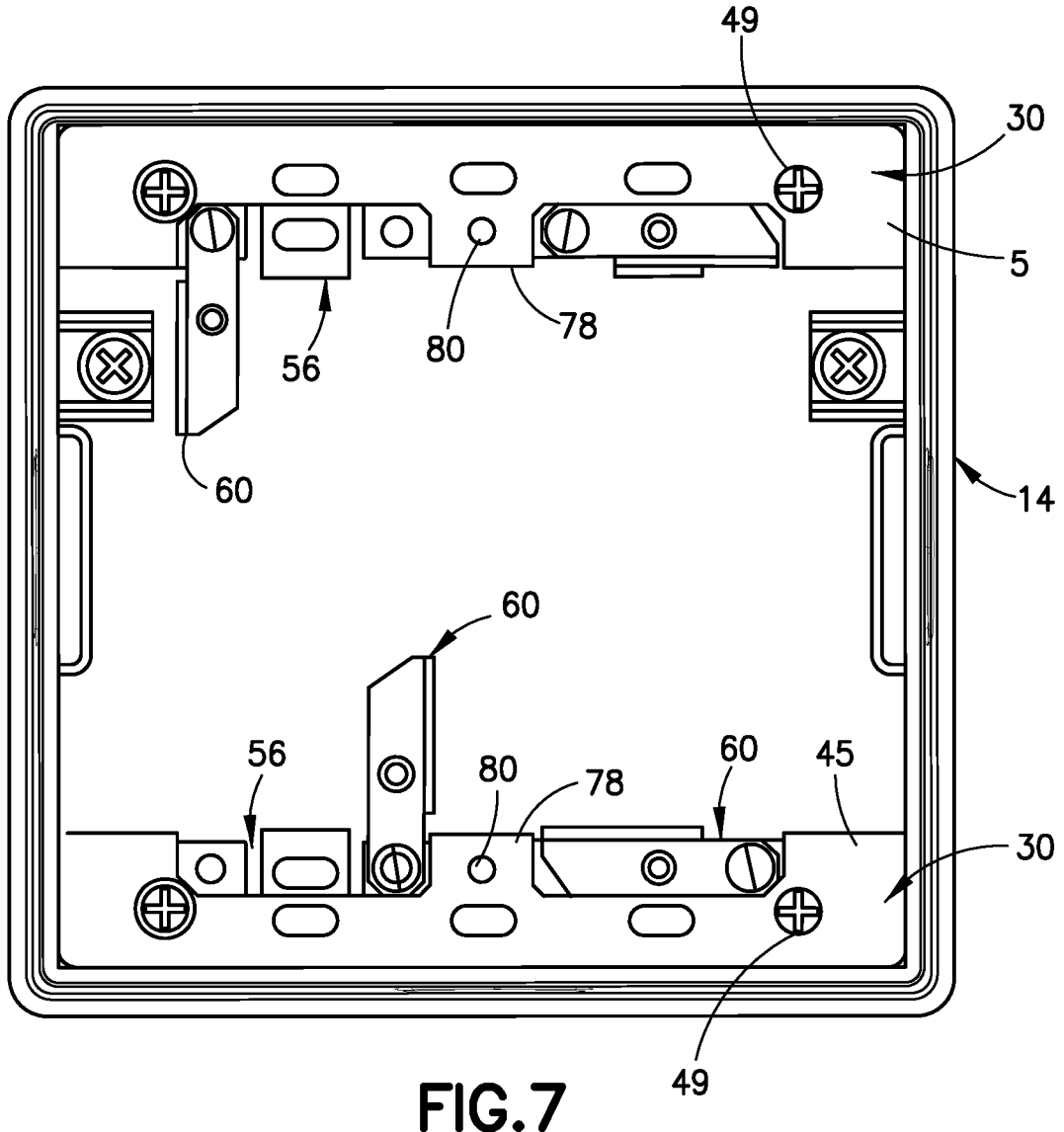
Figure 8:
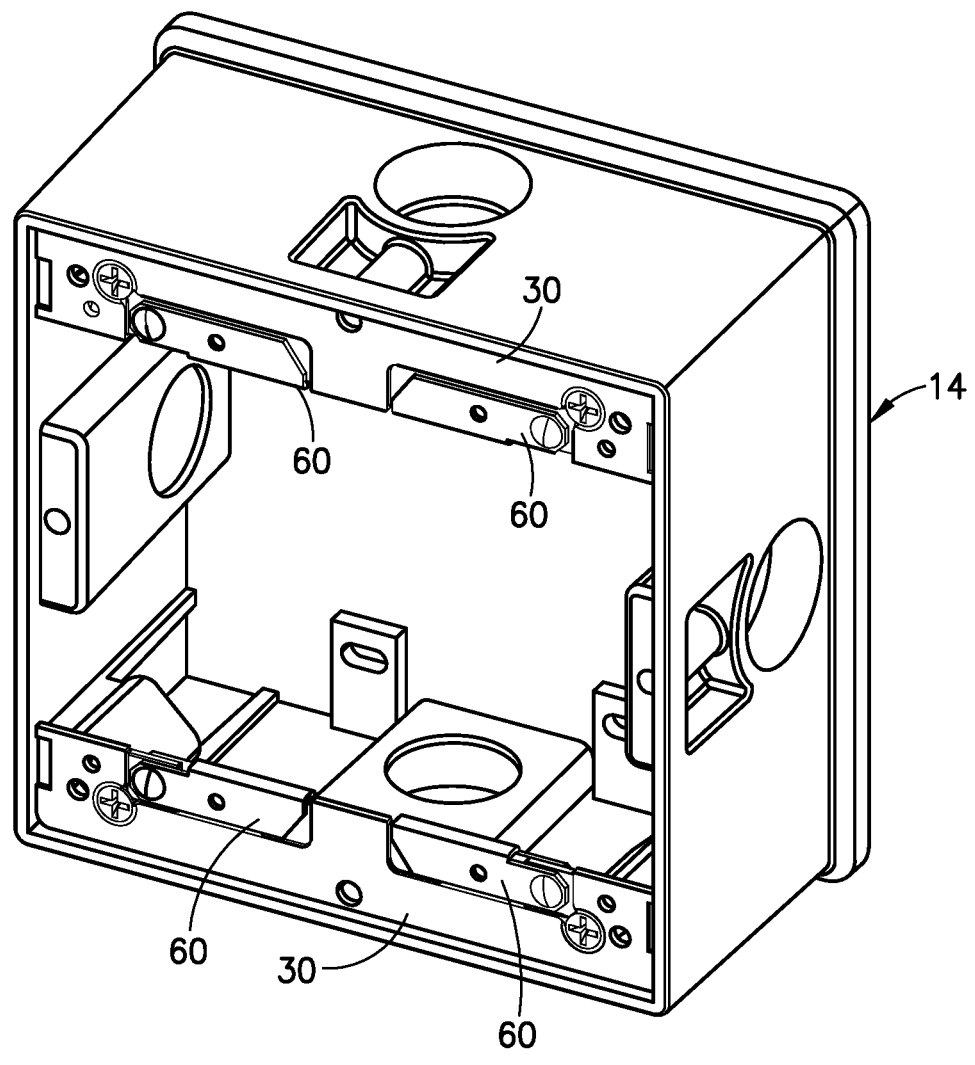
Figure 9:
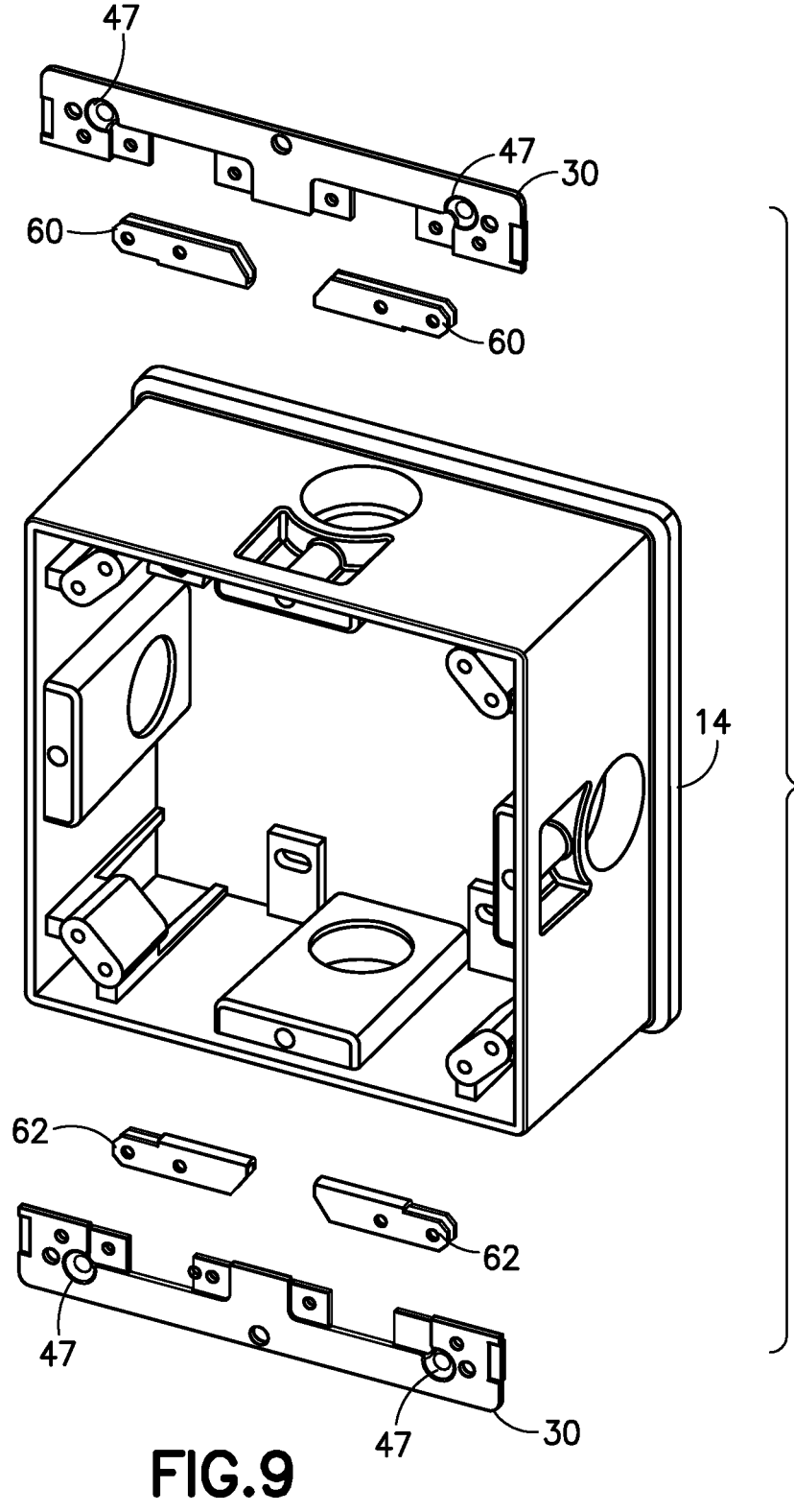
Figure 10:
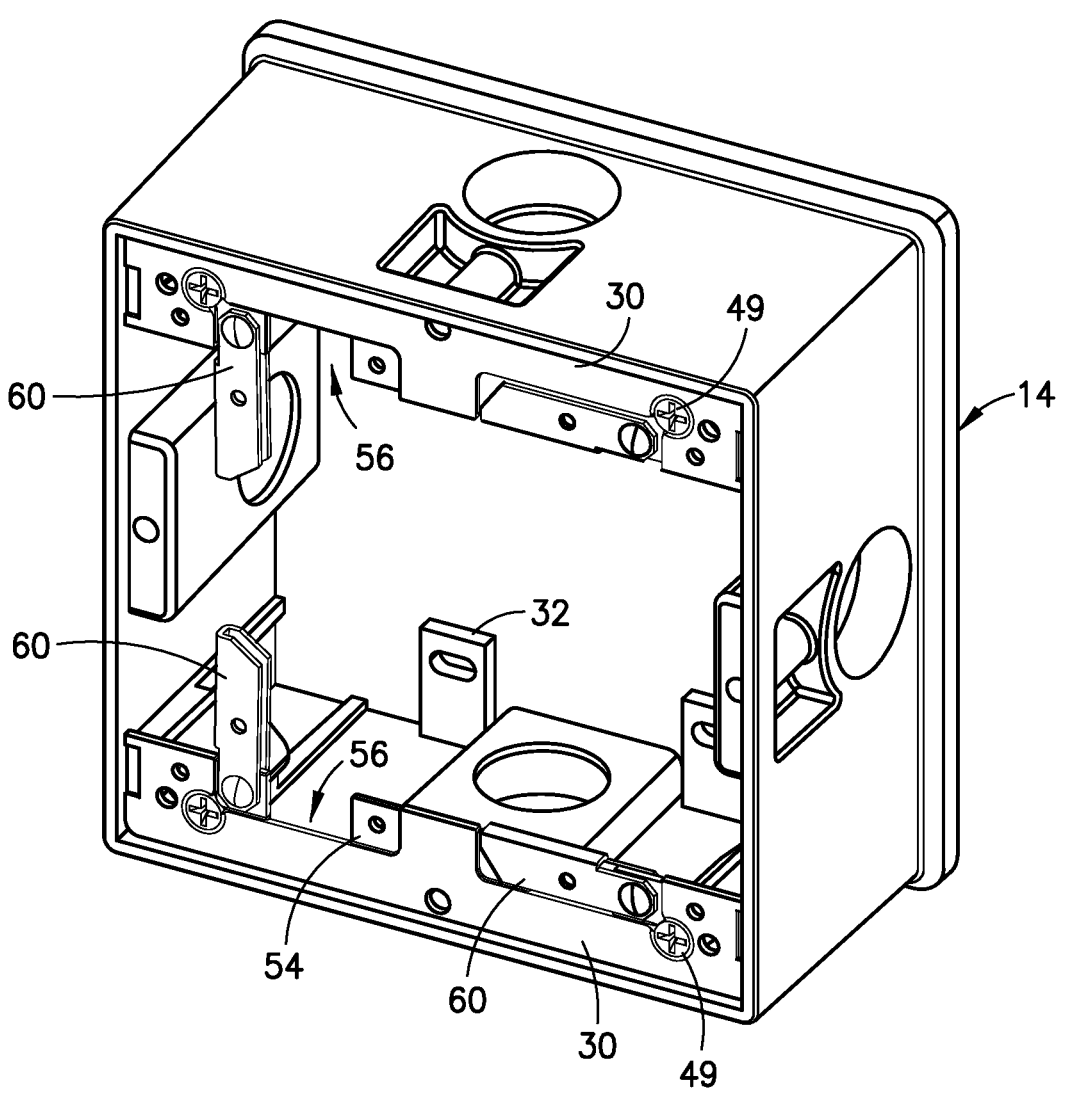
Figure 11:
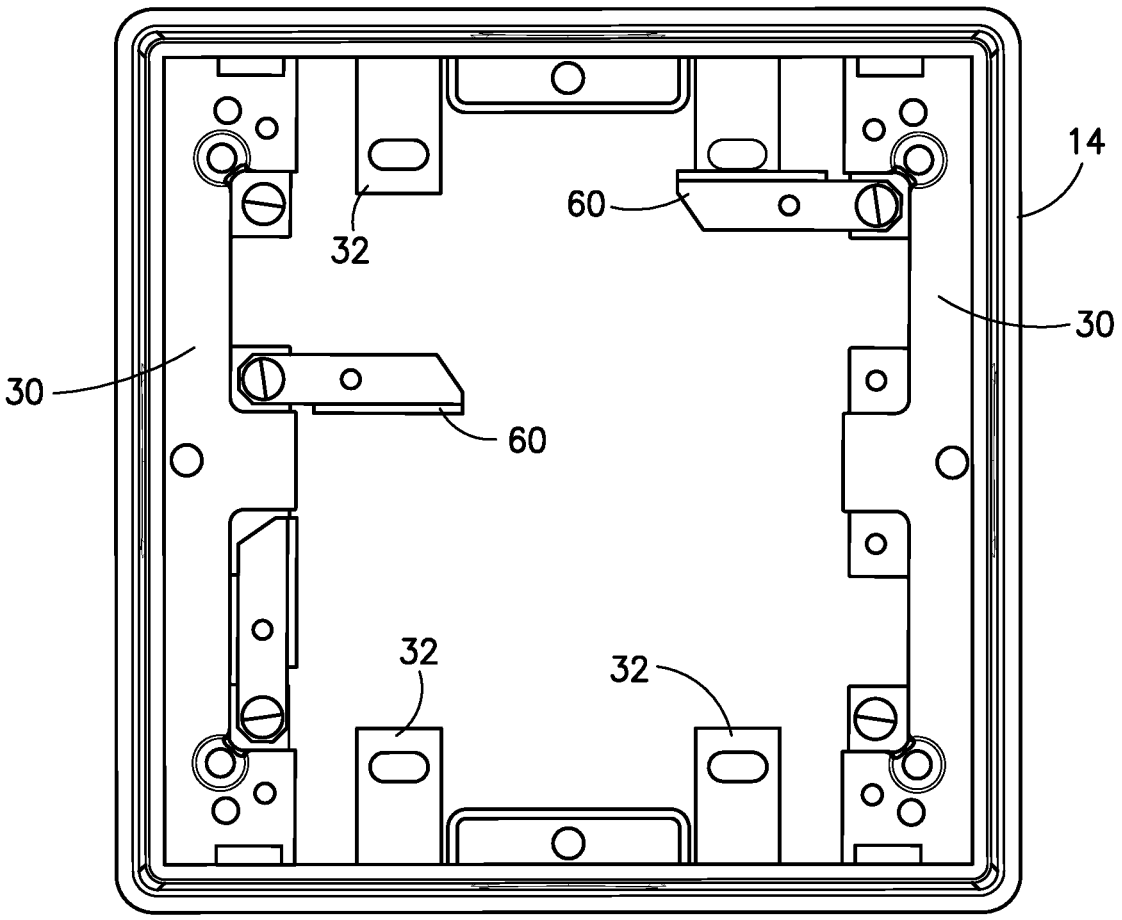

FIG. 2 is perspective view of the electrical box assembly of FIG. 1 showing the electrical box assembly in one embodiment without the electrical device;

FIG. 3 is a rear perspective view of the electrical box extension;

FIG. 4 is an exploded perspective view of the electrical box extension;

FIG. 5 is an exploded front view of the electrical box extension;

FIG. 6 is a front perspective view of the electrical box assembly;

FIG. 7 is a front view of the electrical box extension showing the mounting arms;

FIG. 8 is a perspective view of the electrical box extension in a second embodiment;

FIG. 9 is an exploded view of the electrical box extension of FIG. 8;

FIG. 10 is a perspective view of the electrical box assembly showing the mounting arms in the open position; and FIG. 11 is an elevational view of the electrical box extension showing the mounting plates in a second orientation.

DETAILED DESCRIPTION OF EMBODIMENTS

Reference is made to embodiments of the present device, which are illustrated in the accompanying drawings, wherein like reference numerals refer to like elements throughout. The embodiments described herein exemplify, but do not limit, the present device by referring to the drawings.

It is understood by one skilled in the art that this disclosure is not limited in its application to the details of construction and the arrangement of components set forth in the following description or illustrated in the drawings. The embodiments herein are capable of being practiced or carried out in various ways. It is understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted," and variations thereof herein are used broadly and encompass direct and indirect connections, couplings, and mountings. In addition, the terms "connected" and "coupled" and variations thereof are not restricted to physical or mechanical connections or couplings. Further, terms such as up, down, bottom, and top are relative, and are to aid illustration, but are not limiting. Any of the embodiments and/or elements and features disclosed herein can be combined with one another to form various additional embodiments not specifically disclosed, as long as they do not contradict or are not inconsistent with each other. Terms of degree, such as "substantially", "about" and "approximately" are understood by those skilled in the art to refer to reasonable ranges around and including the given value and ranges outside the given value, for example, general tolerances associated with manufacturing, assembly, and use of the embodiments. The term "substantially" when referring to a structure or characteristic includes the characteristic that is mostly or entirely.

FIG. 1 is a perspective view of an exemplary embodiment of an electrical box assembly 10. In the embodiment illustrated, the electrical box assembly 10 includes an electrical box 12 and an electrical box extension 14. The electrical box 12 in the embodiment shown has a substantially square shape with side walls 16 and an open front end 18. The open front end includes coupling members, such as tabs 19 having a threaded screw hole for receiving a fastener, such as a screw, for attaching the electrical box extension 14 to the electrical box 12. In the embodiment shown the electrical box is a two-gang box having a symmetrical shape where side walls are substantially the same length and configuration.

The electrical box extension 14 is configured for coupling to the electrical box 12 and for supporting at least one electrical device, such as an electrical receptacle 20 shown in FIG. 1. In the embodiment shown, the electrical box extension is a two-gang extension. The electrical box extension 14 has a shape and configuration for coupling to the open end of the electrical box 12. In one embodiment, the electrical box extension 14 can be mounted in different orientations relative to the electrical box 12.

The electrical box extension 14 in the embodiment shown has side walls 22, an open base end 24 at the bottom of the side walls for coupling to the electrical box 12 and an open top end 26 forming a top edge. The bottom end of the side walls 22 include an outwardly extending flange 28 for mating with the electrical box 12 as shown in FIG. 1. A mounting plate 30 is coupled to the open top end 26 for supporting the electrical device 20 within the electrical box extension 14 and/or the electrical box 12.

As shown in FIG. 3, the electrical box extension 14 has inwardly extending mounting tabs 32 at the open base end 24 for coupling the electrical box extension 14 to the electrical box 12. The tabs 32 are shown having an aperture 34 for receiving a screw or other fastener. The tabs 32 are oriented to mate with complementing mounting members or tabs at the open top end of the electrical box 12. The mounting members of the electrical box can have a threaded screw hole for receiving a threaded coupling screw. Typically a threaded screw passes through the apertures 34 and into the mounting member of the electrical box 12 to attach the electrical box extension to the electrical box. As shown in FIG. 4, an optional gasket 36 can be positioned between the electrical box extension and the electrical box.

Referring to FIG. 4, the electrical box extension 14 has an inner cavity 38 with a shape and dimension for receiving the electrical device 20. In the illustrated embodiments, the electrical box and the electrical box extension are a two-gang assembly. In the embodiment shown, a mounting structure is included for supporting the mounting plate 30 in the open end of the electrical box extension. The mounting structure shown in FIG. 4 includes a mounting boss 40 with a screw aperture 42 in each corner of the electrical box extension 14. The electrical box extension can be a one-piece molded member so that the mounting boss can be integrally molded with the electrical box extension. The mounting boss forms a shoulder extending inwardly from the side wall toward the center of the electrical box extension for supporting the mounting plate and the electrical device. The mounting boss 40 and the screw aperture 42 are oriented to receive and support the mounting plate by a coupling screw extending through the mounting plate and into the mounting boss.

The mounting boss 40 has a top face 44 for receiving and supporting the mounting plate. As shown in FIG. 4, the top face 44 of the mounting boss 40 is spaced from the top edge 35 of the side walls 22 to define a recess 46 at the open top end of the electrical box extension. The recess 46 has a dimension and a depth corresponding substantially to the thickness of the mounting plate 30 so that the outer face of the mounting plate 30 is substantially flush with the top edge 35 of the side walls 22 of the electrical box extension 22 to prevent interference with a cover plate (not shown) mating with the top end of the electrical box extension. In other embodiments, the outer face of the mounting plate 30 is recessed with respect to the top edge 35 of the side wall so that the mounting plate does not protrude from the top edge 35. In one embodiment, the mounting bosses 40 are spaced apart from an adjacent mounting boss a uniform distance so the mounting plate can be oriented along any one of the side walls. In embodiment shown, the mounting boss is formed at each corner of the electrical box extension so a mounting plate can be oriented between any two adjacent bosses and a second mounting plate can be mounted along the opposite side. The mounting bosses 40 are spaced to define a recessed area corresponding to the length and width of the mounting plate.

The mounting plate 30 as shown in FIG. 4 has a longitudinal length complementing the recess 46 so that the mounting plate 30 is received within the recess 46 of the electrical box extension. The mounting plate 30 has a screw hole 47 formed at each end to receive a coupling screw 49 for coupling the mounting plate to the respective boss 40. As shown, a mounting plate 30 is provided at opposite ends of the electrical box extension where each mounting plate is substantially identical. In the embodiment shown, the top face 45 of the mounting plate is oriented in substantially the same plane as the front edge of the electrical box so that the mounting plate does not protrude or project from the front edge. The mounting plate 30 has a width sufficient to support the electrical device within the opening of the electrical box extension. As shown in the drawings, a mounting plate 30 is provided at opposite sides of the electrical box extension to support the electrical device. The mounting plate 30 as shown is configured for a two-gang box for supporting two electrical devices 20, although the mounting plate can be configured for a different number of electrical devices. The mounting plate 30 has an outer edge 48 for mating with the inner edge of the side wall and an inner edge 50 facing the interior of the electrical box extension.

The inner edge 50 of the mounting plate 30 in the embodiment shown includes two spaced apart recessed tabs 54 that are recessed relative to the surface of the mounting plate to form a recessed area 52. The recessed tabs 54 are spaced apart to form an open portion 56. The open portion 56 is oriented with respect to the mounting tab 32 to allow access to the mounting tab 32 and the coupling screw that couples the electrical box extension to the electrical box. In the embodiment shown, the mounting plate includes two open portions and two sets of recessed tabs and recessed areas for accommodating two electrical devices. The open portion 56 has a size to allow a screwdriver or other tool to access the coupling screws that attach the electrical box extension to the electrical box.

The mounting plate 30 can include several apertures 76 for attaching a cover plate or other components. In the embodiment shown, the two spaced apart open portions 56 define a center portion 78 having a threaded screw hole for receiving a mounting screw for a cover plate or other device. Apertures 80 shown as elongated openings can be provided for coupling electrical devices to the mounting plate.

As shown in FIGS. 4 and 5, a movable arm 60 is coupled to the mounting plate in each of the recessed area 52. The movable arm 60 in the embodiment shown is pivotally connected to the mounting plate by a pivot member, such as a pin 62, coupled to the mounting plate. The movable arm 60 includes a threaded screw hole 64 for receiving a coupling screw of the electrical device 20 for coupling the electrical device to the electrical box and electrical box extension.

As shown in FIG. 6, the movable arms 60 are formed by an outer plate 66 and an inner plate 68 connected by a connecting portion 70. The connecting portion in the embodiment shown has a substantially U-shape so that the outer plate 66 and the inner plate 68 are parallel and spaced apart a distance to form a gap corresponding to the thickness of the tabs 54 of the mounting plate 30. The outer plate 66 and the inner plate 68 have a free end 72 and 74, respectively, with an aperture for receiving the pivot pin 62.

The movable mounting arms 60 are configured to pivot between a first position overlying the open area 56 in the recessed area of the mounting plate as shown in FIGS. 2 and 4 for receiving and supporting the electrical device 20. The moveable arms 60 are pivotally coupled to the mounting plate to pivot to a second position shown in FIG. 7 where the open area 56 is exposed so that the coupling screw extending through the mounting tab can be accessed by a screw driver or other tool. In this manner, the mounting arms can be moved to a position where they do not interfere with the access to the mounting tabs so that the electrical box extension can be coupled to the electrical box. Once the electrical box extension is coupled to the electrical box, the movable arms can pivot to a position to overlie the open area for mounting the electrical device.

The movable arms 60 have a length and width complementing the dimensions of the recessed portion of the mounting plate so that the movable arms are received within the recessed portion. The outer plate 66 has a thickness corresponding substantially to the depth of the recessed portion so that the outer face of the movable arm is in substantially the same plane as the outer face of the mounting plate so that the mounting arm does not project from the front face of the mounting plate.

In one embodiment, the electrical box extension and/or the electrical box are metallic. In another embodiment, the electrical box extension with the mounting arms and/or the electrical box are made of non-metallic material, such as molded plastic. The mounting plates are typically made of steel, aluminum, or other electrically conducting metal for supporting the electrical device to the metal electrical box extension. The metal mounting plate can also be powder coated. The metal mounting plate can be connected to a suitable ground connection as known in the art. In addition, the metal mounting plate and the associated metal movable arms provide sufficient strength for receiving the coupling screws and supporting the electrical device.

In the embodiment shown, the recessed tabs 54 each have an aperture for receiving a pivot pin 62 of the movable arms 60 so that the movable arms 60 can be oriented to pivot in either direction relative to the mounting plate 30. The outer plate 66 is positioned on an outer face of the respective tab and the inner plate is positioned on an inner surface of the tab. The gap defined between the outer plate and the inner plate slide over the tab opposite the open area to prevent lateral movement of the mounting arm during use. In the embodiment shown in FIGS. 1-7 the movable mounting arms 60 pivot on opposite sides of the open area such that the movable arm in the bottom mounting plate as shown in bottom portion of FIG. 7 pivots in a clockwise direction and the movable arm in the top portion of FIG. 7 pivots in clockwise direction. As shown in FIG. 7, the top movable arm pivots toward the side wall and the bottom movable arm pivots away from the side wall into the open area of the electrical box.

In another embodiment shown in FIGS. 8-10, the movable arms 60 on each mounting plate are coupled to the mounting plate to pivot in opposite directions to each other. As shown in FIG. 10, the movable arms are oriented to pivot in opposite directions so that the movable arms pivot toward the side wall and away from the open area of the electrical box.

The electrical box extension in one embodiment is symmetrical so that the open top end is symmetrical and the side edges of the open end are the same length and configuration. The mounting plates are configured so that a mounting plate can be coupled to the electrical box along any one of the side edges of the open end and a second mounting plate can mounted to an opposite side of the electrical box extension. As shown in FIG. 11, the electrical box extension is coupled to the electrical box and where the electrical device is to be mounted in a horizontal orientation rather than a vertical direction. The mounting plates can be oriented to support an electrical device in the horizontal orientation by moving the mounting plates from one side edge to an adjacent side edge without the need to re-orient the electrical box extension relative to the electrical box.

Although only a few embodiments of the present device are shown and described, the present device is not limited to the described embodiments. Instead, it will be appreciated by those skilled in the art that changes may be made to these embodiments without departing from the principles and spirit of the device. Different embodiments can be combined with other embodiments as long as they are not inconsistent with each other. It is particularly noted that those skilled in the art can readily combine the various technical aspects of the various elements of the various exemplary embodiments that have been described above in numerous other ways, all of which are considered to be within the scope of the disclosure and equivalents thereof.

The invention claimed is:

1. An electrical box assembly, said electrical box assembly comprising:
a front end with an opening with a dimension for receiving an electrical device, an edge surrounding the opening of said electrical box assembly, and a recess at said front end; and
a removable mounting plate received in said recess and coupled to said electrical box assembly, said mounting plate having a first open portion with a dimension for accessing a cavity of said electrical box assembly, and a mounting arm pivotally coupled to said mounting plate at a first side of said open portion and movable between a first position overlying said open portion and a second position exposing said open portion for accessing said cavity, and said mounting arm having a mounting hole for mounting the electrical device, and where said removable mounting plate can be selectively coupled to one of two adjacent side edges of said electrical box assembly.

2. The electrical box assembly according to claim 1, wherein said electrical box assembly is a metallic electrical box, and said mounting plate and mounting arm are an electrically conducting metal or powder coated metal.

3. The electrical box assembly according to claim 1, wherein said mounting plate is removably coupled to said electrical box assembly by a fastener.

4. The electrical box assembly according to claim 1, wherein said mounting plate has a front side with a first recessed portion on a first side of said first open portion and a second recessed portion, said first recessed portion and said second recessed portion having a depth complementing a thickness of a respective mounting arm whereby an outer face of said mounting arm is oriented in substantially the same plane as a plane of said mounting plate.

5. The electrical box assembly according to claim 4, wherein said first recessed portion and said second recessed portion define a recess complementing a length of said mounting arm.

6. The electrical box assembly according to claim 4, wherein said mounting arm has a first end pivotally coupled to said first recessed portion on said first side of said open portion, and a second end configured for coupling with said second recessed portion.

7. The electrical box assembly according to claim 6, wherein each said mounting arms have first plate and a second plate joined by a connecting portion to form a substantially U-shaped portion, said first plate and said second plate having a first end pivotally coupled to said first recessed portion, and said U-shaped portion configured to receive said second recessed portion.

8. The electrical box assembly according to claim 4, wherein said mounting plate has second open portion spaced from said first open portion, a first recessed tab forming said first recessed portion on a first side of said second open portion and a second recessed tab forming said second recessed portion on a second side of said second open portion, and said first recessed tab having another mounting arm pivotally coupled to said first recessed tab.

9. The electrical box assembly according to claim 1, wherein said electrical box assembly includes a mounting boss on an inner surface of said side wall and forming a mounting structure of said mounting plate.

10. The electrical box assembly of claim 1, wherein said electrical box assembly includes a mounting boss in each corner of said box, each said mounting boss having a top face spaced from said front edge of said electrical box assembly to define said recess.

11. An electrical box assembly comprising:
an electrical box having an open front end;
an electrical box extension for coupling to the open front end of the electrical box, the electrical box extension having an open front end, and a recess at said open front end and front edge surrounding said recess; and
a mounting plate received in said recess and removably coupled to said electrical box extension, said mounting plate having an outer face oriented in substantially the same plane as said front edge, a first open portion with a dimension for accessing a cavity of said electrical box extension, and a mounting arm pivotally coupled to said mounting plate at a first side of said open portion and movable between a first position overlying said open portion and a second position exposing said open portion for accessing said cavity, and said mounting arm having a mounting hole for mounting the electrical device, and an outer surface oriented in substantially the same plane as an outer face of said mounting plate.

12. The electrical box assembly according to claim 11, wherein said open end of said electrical box extension is symmetrical having a first side edge and a second side edge joining said first side edge, and where said mounting plate is configured for coupling to either said first side edge or said second side edge of said electrical box extension.

13. The electrical box assembly according to claim 11, wherein said electrical box is a metallic electrical box, and said mounting plate and mounting arm are an electrically conducting metal or powder coated metal.

14. The electrical box assembly according to claim 11, wherein said mounting plate has a front side with a first recessed tab forming a first recessed portion on a first side of said open portion and a second tab on a second side of said open portion forming a second recessed portion, said first recessed portion and said second recessed portion having a depth complementing a thickness of said mounting arm whereby an outer face of said mounting arm is oriented in substantially the same plane as a plane of said mounting plate.

15. The electrical box assembly device of claim 14, wherein said first recessed portion and said second recessed portion define a recess complementing a length of said mounting arm.

16. The electrical box assembly of claim 14, wherein said mounting arm has a first end pivotally coupled to said first recessed tab on said first side of said open portion, and a second end configured for coupling with said second recessed tab.

17. The electrical box assembly device of claim 16, wherein said mounting arm has first plate and a second plate joined by a connecting portion to form a substantially U-shaped portion, said first plate and said second plate having a first end pivotally coupled to said first recessed tab, and said U-shaped portion configured to receive said second recessed tab.

18. The electrical box assembly of claim 11, wherein said electrical box extension includes a mounting boss on an inner surface of said side wall at each corner of said electrical box extension forming a mounting structure of said mounting plate.

19. The electrical box assembly of claim 18, wherein each said mounting boss has a top face spaced from said front edge of said electrical box extension to define said recess.

20. The electrical box assembly of claim 11, wherein the electrical box extension further comprises a base end that has mounting tabs extending therefrom and is distally spaced from said open front end, the mounting tabs being configured to couple the electrical box extension to the electrical box.

\* \* \* \* \*